R. P. WALKER.
Rice Cleaner.
No. 21,913.
Patented Oct. 26, 1858.
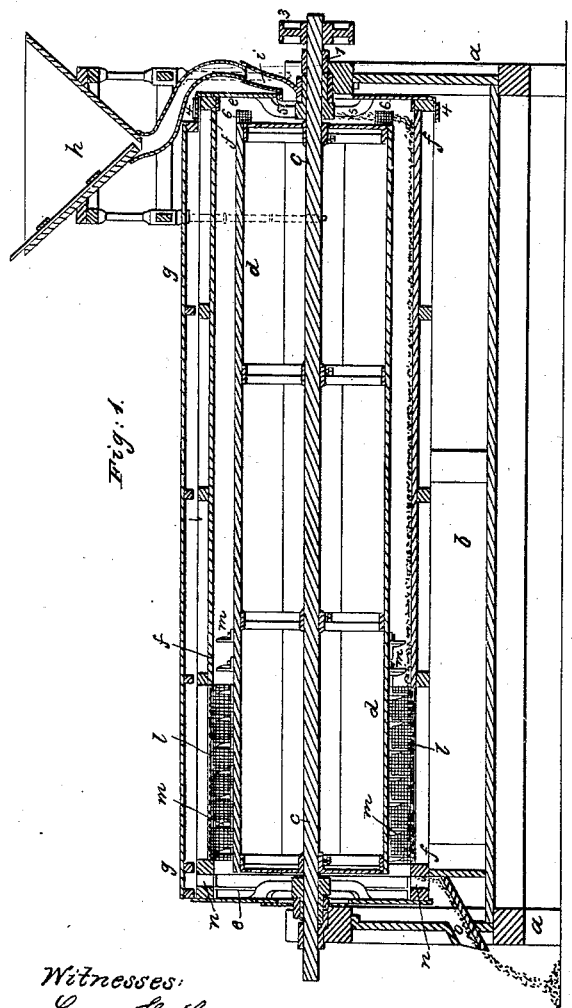
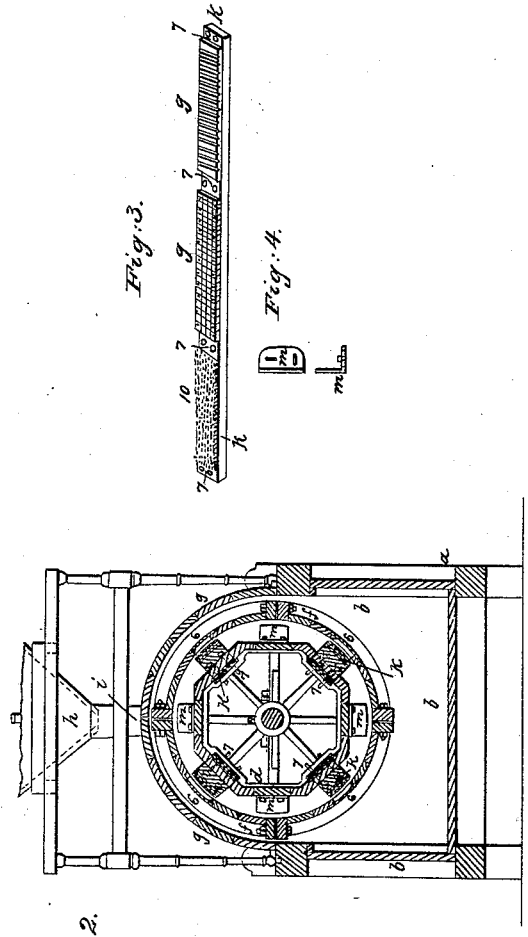
Witnesses:
Lemuel W. Serrell.
Thomas G. Harold.
Inventor:
Robert P. Walker.

UNITED STATES PATENT OFFICE.

R. P. WALKER, OF NEW YORK, N. Y.

MACHINERY FOR PEARLING, POLISHING, AND FINISHING RICE.

Specification of Letters Patent No. 21,913, dated October 26, 1858.

*To all whom it may concern:*

Be it known that I, ROBERT P. WALKER, of the city, county, and State of New York, have invented, made, and applied to use certain new and useful Improvements in Machinery for Pearling, Polishing, and Finishing Rice and Similar Grains; and I do hereby declare that the following is a full, clear, and exact description of the construction and operation of the same, reference being had to the annexed drawings, making part of this specification, wherein—

Figure 1, is a vertical longitudinal section. Fig. 2, is a cross section of the apparatus complete. Fig. 3, is a perspective view of one of the rubbers detached and Fig. 4, is a view of the "flights" made use of to pass the rice along through the machine.

Similar marks of reference denote the same parts.

My said invention relates to finishing the rice ready for market, after the operation of hulling, and acts to remove from the rice what is known as the "douse" and "chit," *i. e.* the outer glutinous coating immediately beneath the hull, and the germ or sprouting point of the berry. To accomplish this purpose it is necessary to bring the rice or grain in contact with a rough or abrading surface, by a slightly yielding rubber, also to allow the berry to turn up on end, and lastly to allow the escape of the douse and chit thus removed while the rice is brushed and finished or polished ready for market. To effect these operations I make use of a cylinder and surrounding casing coated with emery, on the inside of the one, and the outside of the other, and revolving in opposite directions, and acting in connection with screens and rubbers to abrade, remove and pass away the douse and chit and deliver the rice entirely cleaned.

In the drawing $a$, is the framework which is inclosed to form a box $b$, the sides of which can be removed for cleaning out the douse and chit which are deposited therein.

$c$, is a shaft set in journals 1, and carrying the cylinder or prism $d$.

$e, e$, are heads with hollow journals around the shaft $c$, moving in bearings 2, 2, and carrying the cylinder or casing $f$.

$g$ is a semicircular cover over the casing $f$ forming in connection with the box $b$, a chamber in which the cylinders $d$, and $f$ revolve. These cylinders move in opposite direction, and are rotated by competent power, and at the desired speed, the cylinder $d$, being rotated by a belt or otherwise to the pulley 3, and the cylinder or casing $f$ being rotated by a belt to a pulley at 4, on one of the heads $e, e$.

The rice or grain to be acted on is supplied from the hopper $h$, through a spout $i$, and thence it falls through an opening in the head $e$, and for this purpose the arms 5 connect the journal with the head and leave the necessary opening. The grains thus pass in within the cylinder $f$ and between that and the cylinder $d$.

In order to effect the removal of the douse, chit, &c., the cylinders $f$, and $d$, are constructed and operated as follows. The cylinder $f$, is constructed as shown in Figs. 1, and 2, of sections bolted together and to the heads $e, e$, and said cylinder is made close for about two thirds of the length except narrow openings 6, 6, which are covered with wire netting or its equivalent, and the remainder of said cylinder is a complete casing $l$ of fine wire netting, and occupies that end farthest away from the hopper $h$, and the inside of the closed portions of this cylinder are coated with emery attached by suitable glue or cement. The cylinder $d$, may be round or prismatic (as shown) and on one or more of its sides and parallel with the axis I provide sectional rubbers formed on a board $k$, see detached Fig. 3, (I prefer that four of these rubbers be used) and each is attached to the cylinder $d$, or its heads, by means of screws 7, 7, and beneath this board springs 8, 8, are provided so that the said board can be adjusted by tightening or loosening the screws 7, 7. 9, 9, are rubbers formed of gum elastic or equivalent material occupying about two thirds the length of the board, and the surface of these rubbers should be grooved crosswise, diagonally or lengthwise, or in two directions so as to make a yielding and rubbing surface; and 10 is sheep skin attached to said board $k$, and acting opposite the screen $l$. $m, m$, are flights or flanges set on the cylinder $d$, in such a manner and at such an angle that in their revolution they act to pass the grains along with more or less speed. The outer surface of this cylinder $d$, not otherwise occupied is coated with emery.

The operation of this apparatus is, that as the rice passes in between the cylinders $d$, and $f$, it receives a very severe agitation in consequence of said cylinders revolving in opposite directions. The sectional rubbers of gum elastic or equivalent material bring said grains into contact with the surface of emery, and the grains as agitated and thrown from one cylinder against the other, remove the douse and chit, and this sifting through the sieves 6, 6, keeps the rice from heating or being injured, and by the time it arrives at the sheep skin rubbers 10, it is ready for the dust to be brushed off, and pass through the screen $l$, while the rice passes away from an opening $n$, at the end of the cylinder $d$, into a trough or spout $o$, and is ready for market.

The value and importance of this machine will be apparent, for the rice is perfectly cleaned and finished, and that without injury to the grains as is the case where the pearling and finishing are done in pestles and mortars.

I do not claim two cylinders with rubbers having reverse motions, as the same have been used in hulling coffee, &c., neither do I claim rubbers and sheeps skin in machines for hulling grains, as rubbers extending around the cylinder have been used; neither do I claim a surface of emery, as the same has heretofore been used for a variety of purposes, and I have made use of the same in machines for hulling rice but

What I claim as my invention and desire to secure by Letters Patent is—

1. The revolving cylinder $d$, coated with emery and carrying the sectional rubbers of gum elastic or equivalent material, in combination with the hollow cylinder $f$, revolving in the opposite direction to the cylinder $d$, for the purpose of pearling and polishing rice or grains in substantially the manner specified.

2. I also claim the cylinder $f$, constructed substantially as specified, with alternate screens and emery surfaces to act in connection with the interior revolving cylinder ($d$,) to remove and pass away the douse and chit as set forth.

In witness whereof I have hereunto set my signature this twenty-fifth day of June 1858.

ROBERT P. WALKER.

Witnesses:
LEMUEL W. SERRELL,
THOMAS G. HAROLD.